(12) United States Patent
Kojima

(10) Patent No.: US 6,650,676 B2
(45) Date of Patent: Nov. 18, 2003

(54) GAS LASER APPARATUS

(75) Inventor: Kazunobu Kojima, Gamagori (JP)

(73) Assignee: Nidek Co., Ltd., Gamagori (JP)

( * ) Notice: Subject to any disclaimer, the term of this patent is extended or adjusted under 35 U.S.C. 154(b) by 64 days.

(21) Appl. No.: 09/895,207

(22) Filed: Jul. 2, 2001

(65) Prior Publication Data

US 2002/0001329 A1 Jan. 3, 2002

(30) Foreign Application Priority Data

Jul. 3, 2000 (JP) ........................................ 2000-205575

(51) Int. Cl.[7] .............................. H01S 3/22; H01S 3/223
(52) U.S. Cl. .......................................... 372/55; 372/55
(58) Field of Search ............................ 372/29.013, 55, 372/61

(56) References Cited

U.S. PATENT DOCUMENTS 4,096,449 A * 6/1978 Foster ......................... 372/58
4,611,327 A 9/1986 Clark et al.
5,097,475 A * 3/1992 Perzl et al. ................... 372/87
6,490,310 B1 * 12/2002 Yabu et al. .................... 372/87

FOREIGN PATENT DOCUMENTS

| JP | 402288384 A | * 11/1990 | ........... H01S/3/097 |
| JP | 405267764 A | * 10/1993 | ........... H01S/3/038 |
| JP | H7-26855 | 6/1995 | |
| JP | 2000252556 A | * 9/2000 | ............ H01S/3/03 |
| JP | 02001223415 A | * 4/2001 | ............ H01S/3/03 |

* cited by examiner

Primary Examiner—Paul Ip
Assistant Examiner—Phillip Nguyen
(74) Attorney, Agent, or Firm—Oliff & Berridge, PLC

(57) ABSTRACT

A gas laser apparatus includes a chamber in which laser medium gas is sealingly filled; a pair of main discharge electrodes arranged opposite to each other in the chamber; and a fan disposed in the chamber; wherein the chamber has an inner wall of a substantially elliptic shape in a plane perpendicular to a lengthwise direction of the chamber, and a part of the inner wall being between the fan and the main discharge electrodes serves as a guide for guiding the gas made to flow by the fan toward the main discharge electrodes.

7 Claims, 4 Drawing Sheets

FIG.3 A

REPETITION FREQUENCY AND OUTPUT ENERGY

| CHARGE VOLTAGE | REPETITION FREQUENCY | CONVENTIONAL PRODUCT | | PRESENT EMBODIMENT PRODUCT | |
|---|---|---|---|---|---|
| | | ENERGY: mJ | DECREASING RATE TO 10Hz | ENERGY: mJ | DECREASING RATE TO 10Hz |
| 30kV | 10Hz | 245 | 100.0% | 269 | 100.0% |
| | 30Hz | 223 | 91.0% | 253 | 94.1% |
| | 50Hz | 212 | 86.5% | 241 | 89.6% |

GAS VELOCITY BETWEEN MAIN DISCHRGE ELECTRODES (FROM WIND-TUNNEL EXPERIMENTAL RESULTS)

| | CONVENTIONAL PRODUCT | PRESENT EMBOD. PRODUCT |
|---|---|---|
| POINT NEAR UPPER ELECTRODE | 12.0 | 13.0 |
| MIDDLE POINT | 14.0 | 13.5 |
| POINT NEAR LOWER ELECTRODE | 9.0 | 15.0 |
| AVERAGE OF VELOCITIES AT THREE POINTS | 11.7 | 13.8 |

GAS LASER APPARATUS

BACKGROUND OF THE INVENTION

1. Field of the Invention

The present invention relates to a gas laser apparatus which discharges and excites laser medium gas to oscillate (output) laser light.

2. Description of Related Art

There has been known a gas laser apparatus which is provided with a pair of main discharge electrodes and preionization electrodes, and discharges to excite laser medium gas (hereinafter, simply referred to as gas) to oscillate laser light (for example, excimer laser light). Such the apparatus has a configuration shown in FIG. 1, in which a spark discharge is made between each of the pairs of preionization electrodes 2a and 2b disposed opposite to each other thereby to discharge and excite the gas sealingly filled in a chamber 1. Then, the ultraviolet light and electrons which are generated by the discharge and excitation are supplied to between main discharge electrodes 3a and 3b, causing a glow discharge with optical resonance, thereby oscillating laser light.

The chamber 1 of an almost perfect circular form in section is provided therein with a fan 4 used for gas circulation. A gas flow generated by the fan 4 prevents the gas which has been deteriorated by the discharge from stagnating between the electrodes 2a, 2b, 3a, and 3b. This fan 4 is arranged in an appropriate position for conveying (sending) the gas to the electrodes, without interference with a dust collector, a cooling pipe, and other components provided within the chamber 1, which are not shown in FIG. 1.

Provided inside the chamber 1 is a guide plate 5 for efficiently producing a flow of the gas from the fan 4 to the electrodes. The mounting position and shape of this guide plate 5 are determined by fluid mechanical calculations, verification experiments, and others. Furthermore, a restriction plate 6 is disposed for allowing the gas to efficiently flow to the electrodes. This restriction plate 6 is arranged to configure a gas passage B toward the electrodes in cooperation with the guide plate 5.

As the number of parts or members increases, however, the structure of the apparatus becomes more complex with an increased cost.

Meanwhile, in an apparatus which oscillates excimer laser light by using fluorine gas, an increase in contact areas of the apparatus with the gas would cause fluorine absorption to the surface of parts. This reduces gas purity, but increases impure gas which will decrease oscillation efficiency.

SUMMARY OF THE INVENTION

The present invention has been made in view of the above circumstances and has an object to overcome the above problems and to provide a gas laser apparatus capable of efficiently, stably oscillating laser light without needing complex structure.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a gas laser apparatus including: a chamber in which laser medium gas is sealingly filled; a pair of main discharge electrodes arranged opposite to each other in the chamber; and a fan disposed in the chamber; wherein the chamber has an inner wall of a substantially elliptic shape in a plane perpendicular to a lengthwise direction of the chamber, and a part of the inner wall being between the fan and the main discharge electrodes serves as a guide for guiding the gas made to flow by the fan toward the main discharge electrodes.

According to another aspect of the present invention, there is provided a gas laser apparatus including: a chamber in which laser medium gas is sealingly filled; a pair of main discharge electrodes arranged opposite to each other in the chamber; a fan disposed close to an inner wall of the chamber; a first restriction plate disposed between the fan and the main discharge electrodes, which restricts a flow of the gas from the fan; a second restriction plate arranged in almost symmetric relation to the first restriction plate about a center line of the chamber, which restricts a flow of the gas from the main discharge electrodes; wherein the chamber has an inner wall of a substantially elliptic shape in a plane perpendicular to a lengthwise direction of the chamber, and a part of the inner wall being between the fan and the main discharge electrodes serves as a guide for guiding the gas made to flow by the fan toward the main discharge electrodes.

Furthermore, according to another aspect of the present invention, there is provided a gas laser apparatus including: a chamber in which laser medium gas is sealingly filled; a pair of main discharge electrodes arranged opposite to each other in the chamber; a fan disposed in the chamber; wherein a part of the inner wall being between the fan and the main discharge electrodes serves as a guide for guiding the gas made to flow by the fan toward the main discharge electrodes.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIGS. 3A and 3B are a table and a graph showing comparison data between the prior art apparatus and the apparatus in the embodiment.

DETAILED DESCRIPTION OF THE PREFERRED EMBODIMENTS

A detailed description of a preferred embodiment of a gas laser apparatus embodying the present invention will now be given referring to the accompanying drawings.

Figure 2:
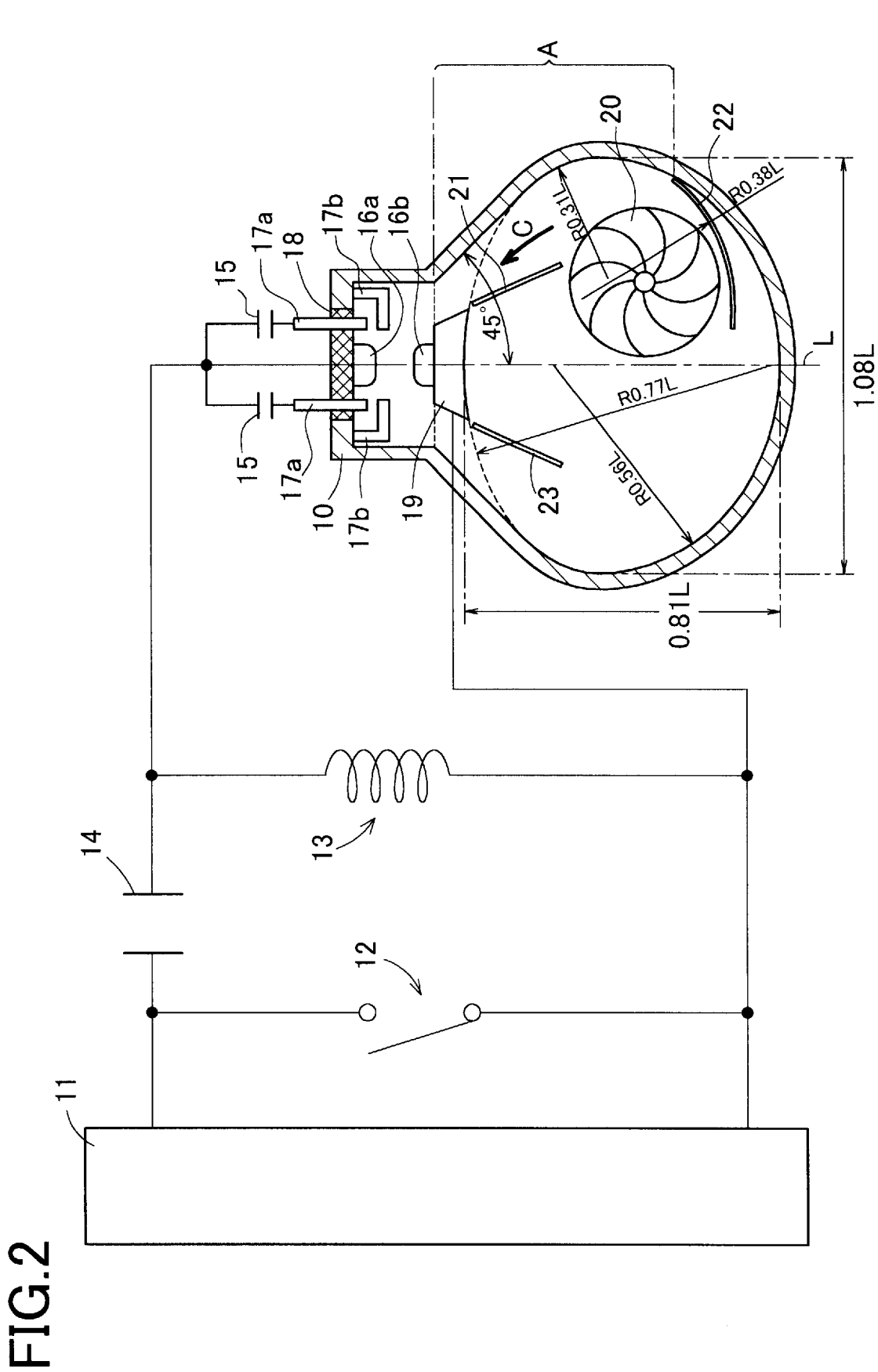
FIG. 2 is a schematic structural view of a gas laser apparatus in an embodiment according to the present invention.

FIG. 2 is a schematic structural view of the gas laser apparatus in the present embodiment. It is to be noted that an apparatus exemplified in this embodiment is an excimer laser apparatus which discharge to excite laser medium gas (hereinafter, simply referred to as gas) made of a mixture of argon (Ar) gas and fluorine (F2) gas for oscillating excimer laser light (with an oscillation wavelength of 193 nm).

Numeral 10 is a chamber in which the gas is sealingly filled. This chamber 10 is generally made of aluminum or the like. Since it is filled with fluorine gas, the chamber 10 is subjected in advance to processing for improving corrosion resistance. For example, a passive film made of fluorine is formed on the inner wall of the chamber 10.

Numeral 11 is a high-voltage power supply; 12 is a switch; 13 is a coil; 14 is a storage capacitor; and 15 is a peaking capacitor.

Numerals 16a and 16b are a pair of main discharge electrodes of an ERNST type disposed in the chamber 10, each having a semicircular shape in section which is suitable for performing a uniform glow discharge between the electrodes. Numerals 17a and 17b are two pairs of preionization electrodes, each pair being disposed on either side of the electrode 16a. Those electrodes 17a and 17b are positioned with respective end parts being faced opposite at a predetermined interval. The electrodes 17a are connected to the peaking capacitors 15 respectively through an insulator 18. The electrodes 17b, on the other hand, are fixed to the chamber 10 having electrical conductivity. Numeral 19 is an electrically conductive plate on which the electrode 16b is fixedly mounted.

Numeral 20 is a fan disposed in a lower part within the chamber 10, for circulating the gas. Numeral 21 is a restriction plate placed between the fan 20 and the electrodes 16a, 16b, 17a, and 17b. Numeral 22 is a restriction plate disposed near the underside of the fan 20. In addition, numeral 23 is a restriction plate arranged in almost symmetric relation to the restriction plate 21 about a center line L of the chamber 10. It is preferable that each of those restriction plates 21, 22, and 23 has a length (in a perpendicular direction to the drawing paper) equal to that (in a perpendicular direction to the drawing paper) of at least the electrodes 16a and 16b.

An inner wall portion A of the chamber 10 between the vicinity of the fan 20 and the electrodes is given the shape determined by fluid mechanical calculations or verification experiments and others so that the gas is made efficiently flow from the fan 20 toward each of the electrodes in consideration of their individual positions. In the present embodiment, as shown in FIG. 2, the inner wall portion A is of a configuration including both a curved shape (on the fan 20 side) and a flat or straight shape (on the electrodes side). The distance between the inner wall portion A and the fan 20 is designed to be shorter than that in the prior art apparatus. The above configuration provides a gas passage C when the restriction plate 21 is simply disposed in the chamber 10.

In the present embodiment, the restriction plates 22 and 23 arranged in the chamber 10 serve to allow the gas to more efficiently flow. In particular, the provision of the restriction plate 23 is convenient to let the gas efficiently flow (return) from each of the electrodes to the fan 20. Each mounting position of the fan 20, the restriction plates 21, 22, and 23 is further determined by verification experiments and others.

It is to be noted that the shape of the inner wall portion A and the mounting positions of the electrodes and the fan 20 may be determined in consideration of all the three; the electrodes, the fan 20, and the inner wall portion A.

Based on the shape of the inner wall portion A, the shape of an entire inner wall of the chamber 10 in a plane (section) perpendicular to the lengthwise direction of the chamber 10 (namely, in a perpendicular direction to the drawing paper) is made substantially elliptic. The shape of an outer wall of the same is also made elliptic. The chamber 10 having such the almost elliptic shape in section is more advantageous in strength for a pressure container as compared with a chamber of an almost square shape in section. The almost elliptic section permits the wall to be made thin in thickness. As a result thereof, the apparatus can be reduced in weight. Even comparing with a chamber of an almost perfect circular section, furthermore, the chamber having the almost elliptic section can be formed with a reduced height while the strength and the volume are unchanged. Thus, the apparatus can also be downsized. Based on those characteristics resulting from the elliptic shape, the apparatus in the present embodiment is shaped as shown in FIG. 2.

Figure 1:
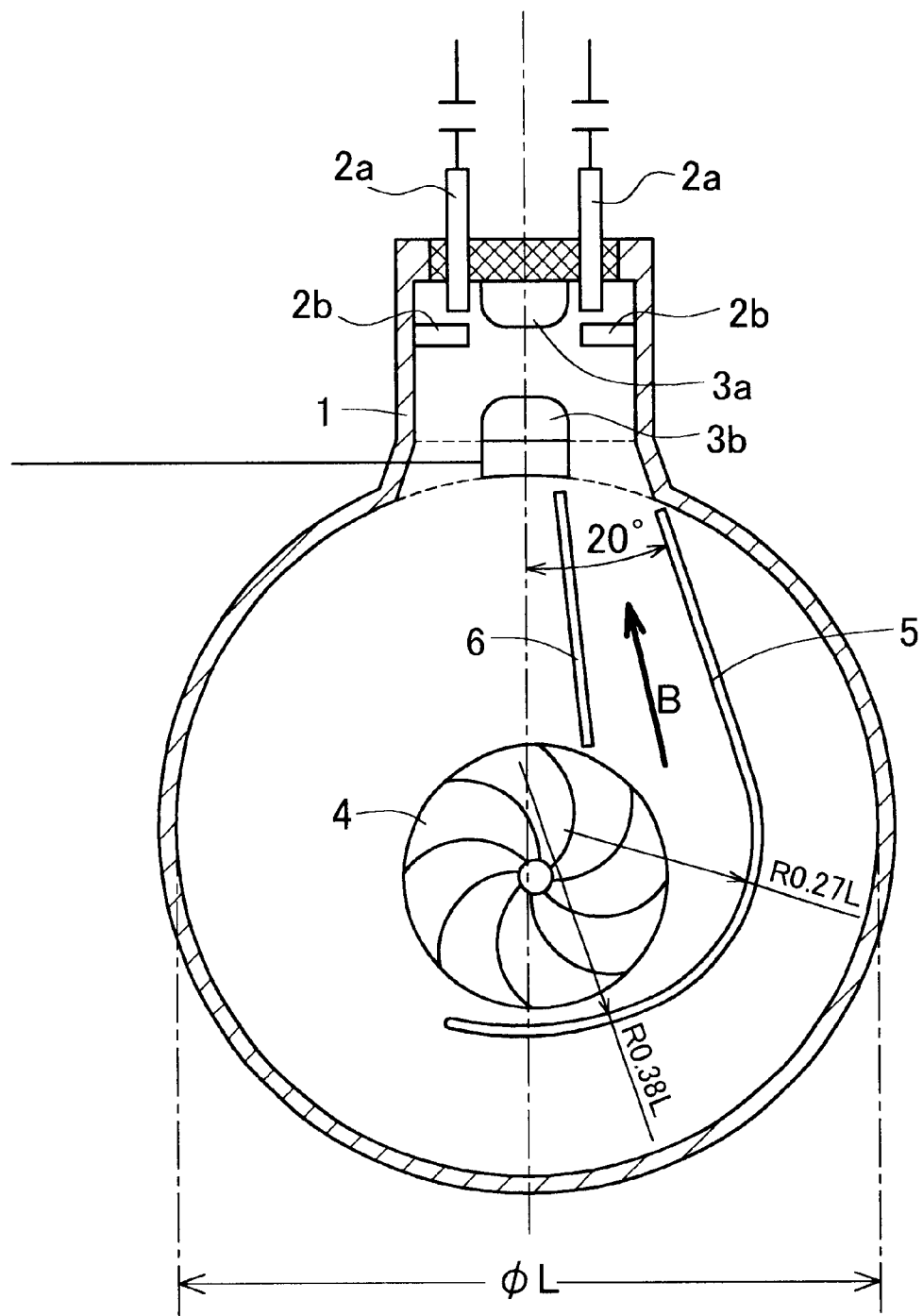
FIG. 1 is a schematic structural view of a gas laser apparatus in a prior art.
Figure 3B:
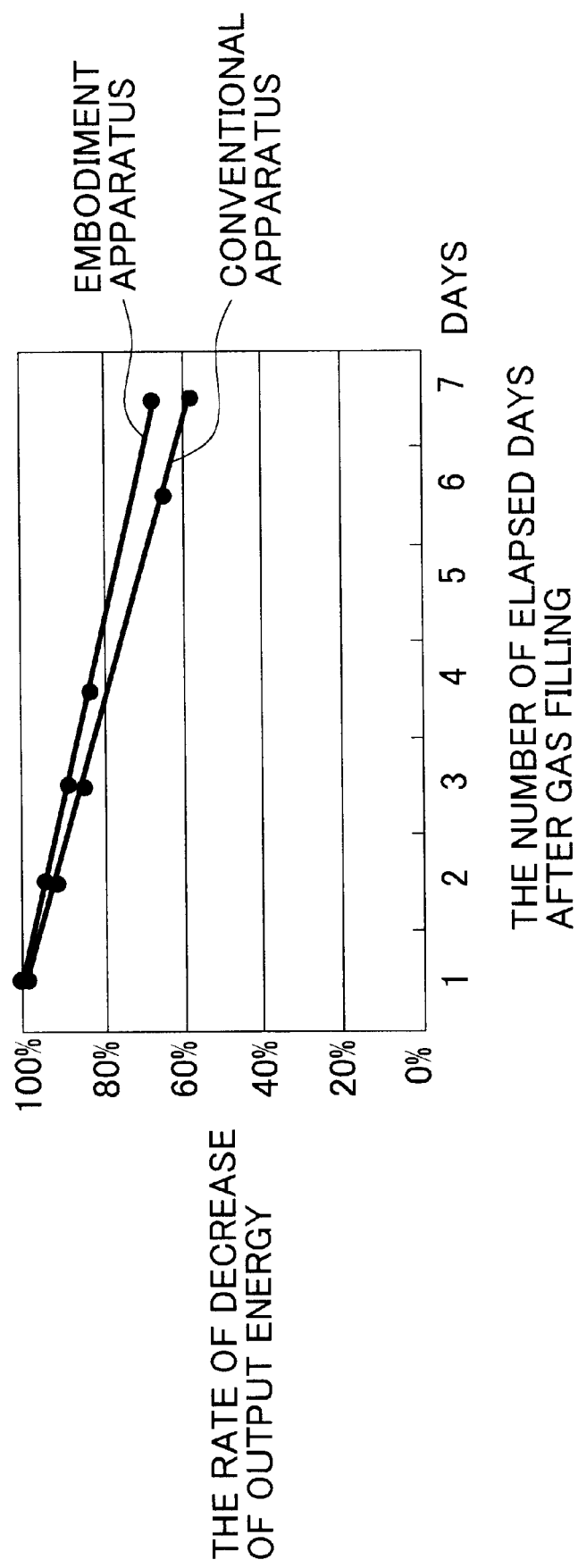

FIGS. 3A and 3B are a table and a graph each showing comparison data between the prior art apparatus and the apparatus in the present embodiment, which are obtained as results of performance experiments. Those apparatuses used in the experiments have the sizes written in FIGS. 1 and 2 respectively. To be more specific, FIG. 3A is a table showing experimental results on the relation between output energy and repetition frequency; 10 Hz, 30 Hz, and 50 Hz, and another table showing wind-tunnel experimental results on velocity of the gas flowing between the main discharge electrodes at three points; near an upper electrode, near a lower electrode, and a middle therebetween. FIG. 3B is a graph showing experimental results on the rate of decrease of the output energy in relation to the number of elapsed days after gas filling.

It is understood from the above experimental results that the apparatus in the present embodiment produced better results on both the energy efficiency and the gas service life than the prior art apparatus. It is conceivable that the above results are caused by that the present embodiment apparatus has a better efficiency of gas circulating (sending) as compared with the prior art apparatus and that a reduction of the surface area of built-in parts decreases the factors of gas pollution, even though the present embodiment apparatus has a gas capacity less than the prior art apparatus.

To be more specific, in the prior art apparatus, the gas mostly, directly impinges on an upper electrode and is thereby reflected to impinge on a lower electrode. Thus, the gas velocity would decrease in the vicinity of the lower electrode. In the apparatus in the present embodiment, on the other hand, the flow of the gas is guided along the inner wall surface of the chamber 10 and the gas is allowed to impinge equally on an upper and lower electrodes. As a result, the deteriorated gas stagnating around the lower electrode can efficiently be removed.

It is needless to say that the shapes of the inner and outer walls of the chamber 10 of the present invention in a plane (section) perpendicular to the lengthwise direction are not limited to the almost elliptic shapes.

Next, the laser oscillating operation of the excimer laser apparatus in the present embodiment is briefly explained.

With the switch 12 opened, the storage capacitor 14 is charged from the power supply 11. After the charge, the switch 12 is closed, allowing the electrical charge stored in the capacitor 14 to travel into the peaking capacitor 15 via the switch 12. This travel of charge causes the application of voltage to the electrodes 17a, 17b, 16a, and 16b.

Then, an electrical breakdown is first produced between the electrodes 17a and 17b, which causes a spark discharge. Sequentially, ultraviolet light is generated by the spark discharge and preionizes the gas prior to a main discharge, producing electrons. These produced electrons are supplied to the electrodes 16a and 16b, causing a glow discharge between the electrodes 16a and 16b, thereby exciting the gas. As a result, optical resonance is produced between unillustrated optical resonance systems to oscillate laser light.

The inner wall portion A of the chamber 10 provides as mentioned above, in cooperation with the restriction plate 21, the passage C for efficiently sending the gas toward the electrodes. Through this passage C, the gas flow generated by the fan 20 during operation is directed toward the electrodes without flow disturbance. The gas can thus efficiently, continuously be supplied to between the electrodes. This can perform stable and efficient laser oscillation.

As described above, according to the present invention, the apparatus with a simple structure enables stable and efficient laser oscillation.

The present invention may be embodied in other specific forms without departing from the spirit or essential characteristics thereof. For instance, the present invention is not limited to the excimer laser apparatus explained in the above embodiment, and may be applied to other gas laser apparatuses, as well, such as a carbon dioxide ($CO_2$) laser apparatus and a nitrogen laser apparatus of a transverse discharge pumping type.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A gas laser apparatus including:
    a chamber in which laser medium gas is sealingly filled, the chamber having an upper section that houses a pair of main discharge electrodes arranged opposite to each other and a lower section, the lower section of the chamber having an inner wall of a substantially elliptic shape in a cross-section perpendicular to a lengthwise direction of the main discharge electrodes, and the inner wall of the lower section having, at a portion nearer to the upper section, a different shape in the cross-section from the elliptic shape, the upper section and the lower section being connected to each other;
    a fan disposed in the lower section of the chamber; and
    a pair of restriction plates disposed in the lower section of the chamber which define a flow pattern of the gas propelled by the fan past the discharge electrodes.

2. The gas laser apparatus according to claim 1, wherein the fan is placed close to the inner wall the lower section of the chamber.

3. The gas laser apparatus according to claim 1, wherein the inner wall of the lower section between the fan and the main discharge electrodes has a curved shape and a flat shape.

4. The gas laser apparatus according to claim 1, wherein the inner wall of the lower section has a straight portion nearer to the upper section, the portion being symmetrically inclined with respect to a center line of the lower section.

5. A gas laser apparatus including:
    a chamber in which laser medium gas is sealingly filled, the chamber having an upper section housing a pair of main discharge electrodes arranged opposite to each other and a lower section, the lower section of the chamber having an inner wall of a substantially elliptic shape in a cross-section perpendicular to a lengthwise direction of the main discharge electrodes, and the inner wall of the lower section having, at a nearer portion to the upper section, a different shape in the cross-section from the elliptic shape, the upper section and the lower section being connected to each other;
    a fan disposed close to the inner wall of the lower section of the chamber;
    a first restriction plate disposed between the fan and the upper section in the lower section of the chamber, which forms a first flow of the gas flowing from the fan toward the main discharge electrodes; and
    a second restriction plate arranged in almost symmetric relation to the first restriction plate about a center line of the chamber, which forms a second flow of the gas flowing from the upper section toward a bottom of the lower section.

6. The gas laser apparatus according to claim 5, wherein the inner wall of the lower section between the fan and the main discharge electrodes has a curved shape and a flat shape.

7. The gas laser apparatus according to claim 5, wherein the inner wall of the lower section has a straight portion nearer to the upper section, the portion being symmetrically inclined with respect to the center line of the lower section.

* * * * *